June 1, 1937.  L. T. HUGHES  2,082,398
TRAILER HITCH AND AUTOMATIC BRAKE CONTROL
Filed May 31, 1935     5 Sheets-Sheet 3
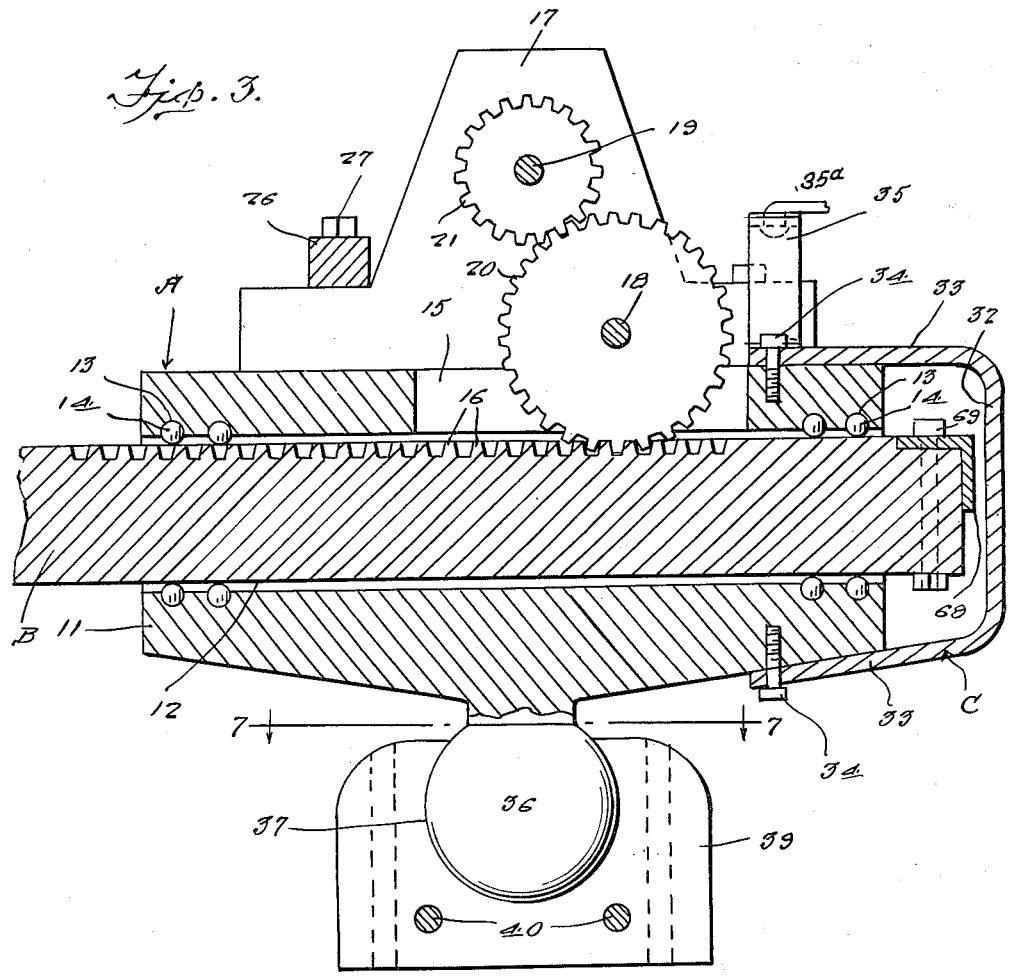
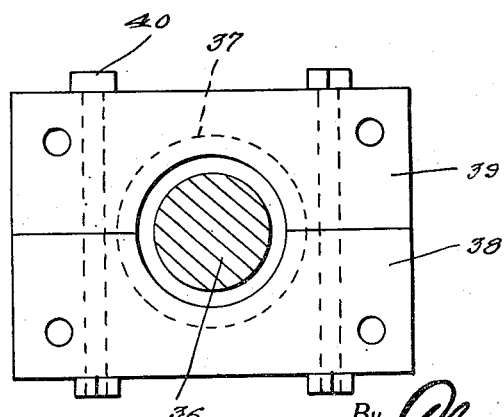
Inventor
L. T. Hughes
By Clarence A. O'Brien
Attorney

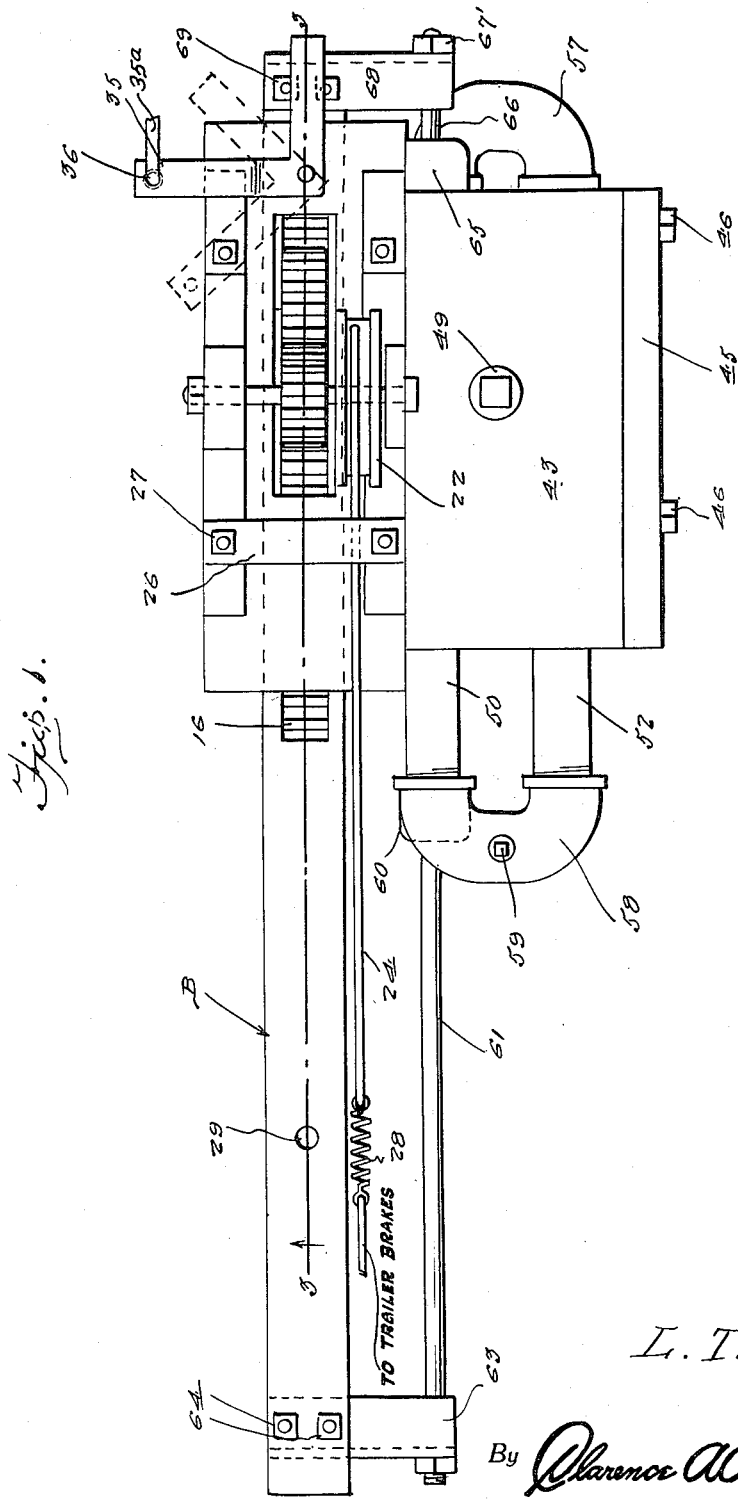

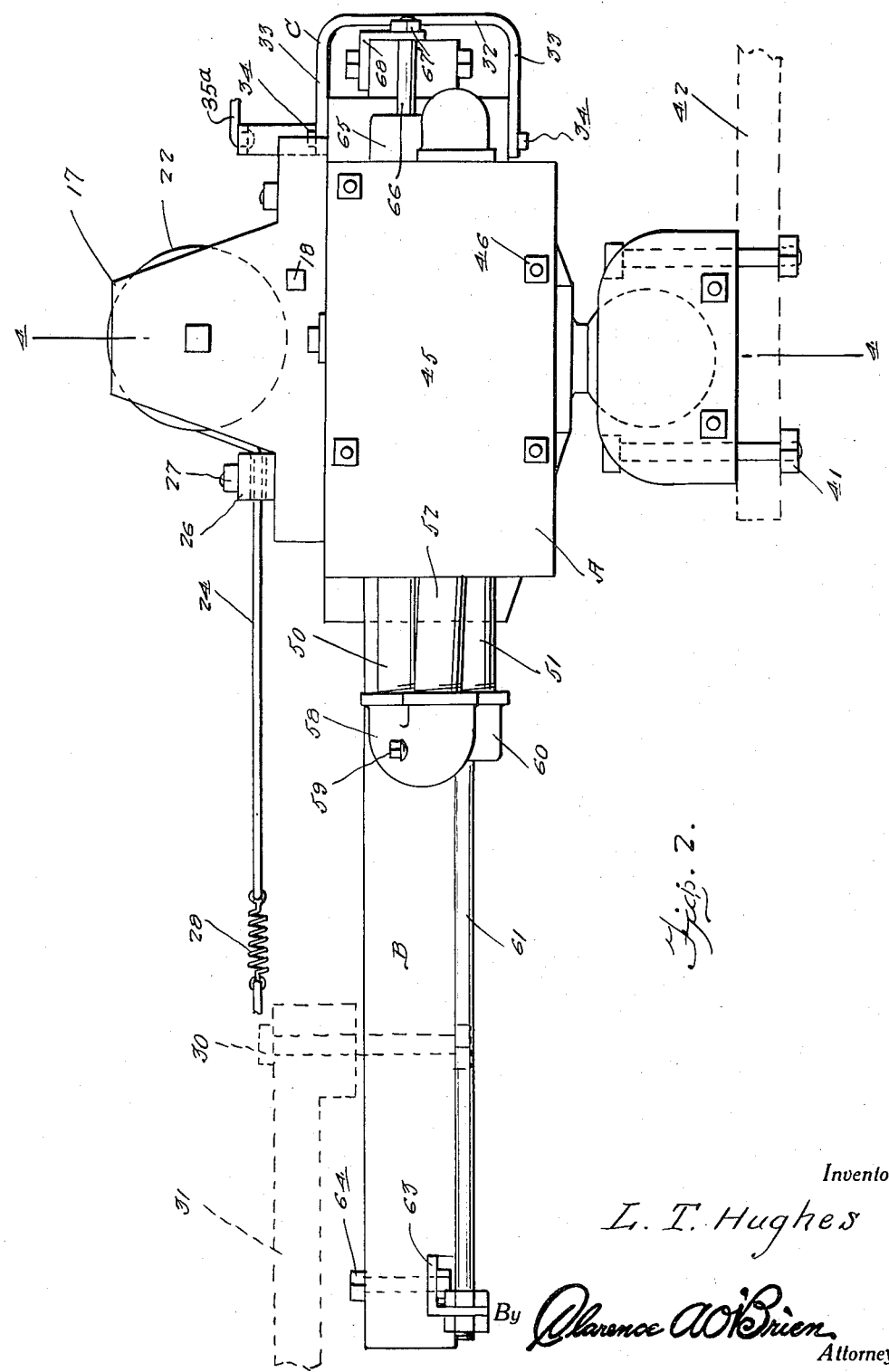

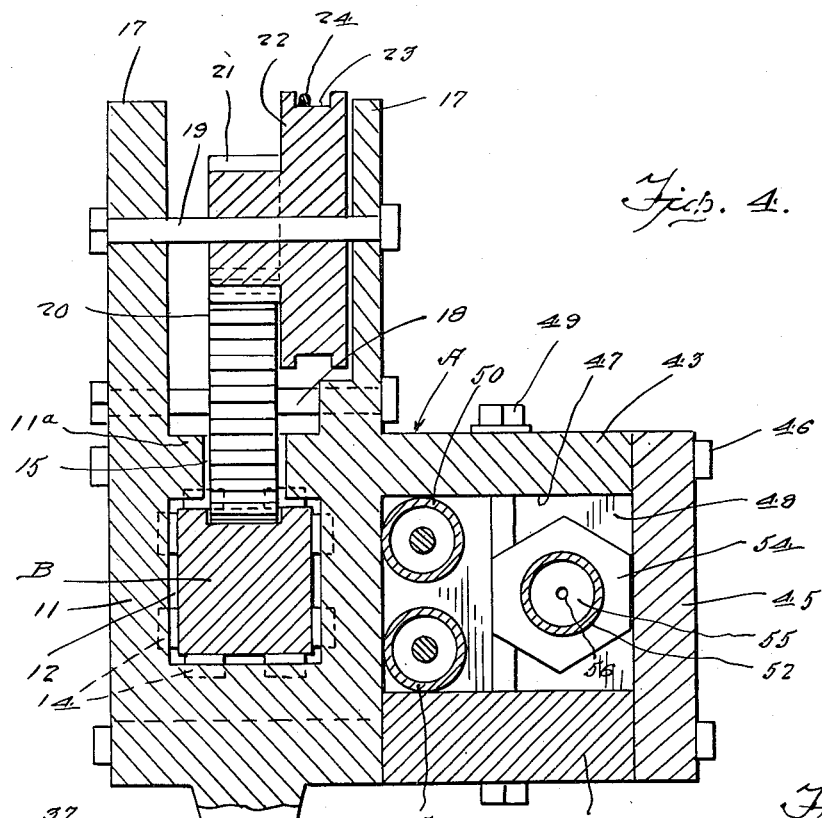

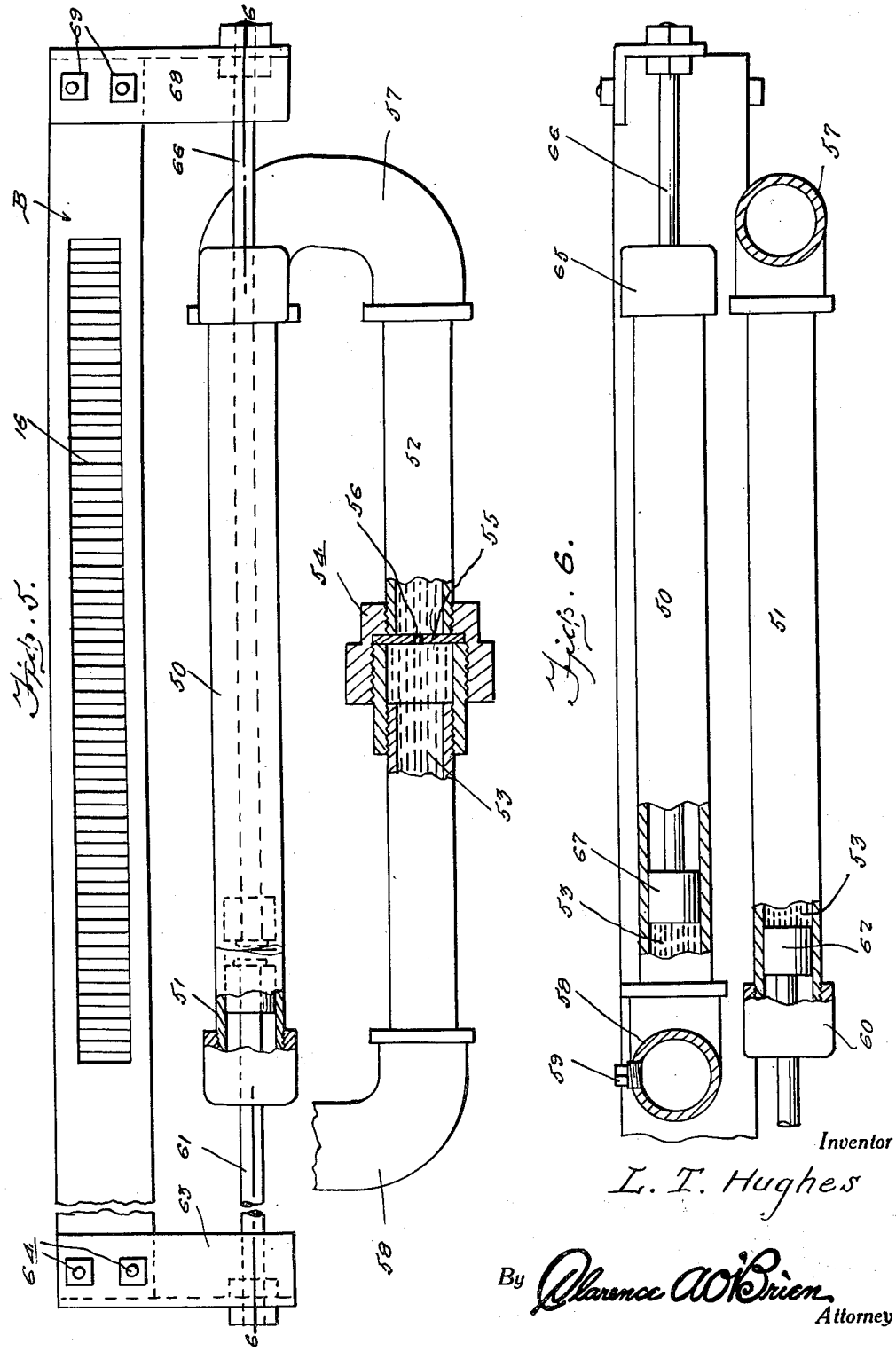

Patented June 1, 1937

2,082,398

UNITED STATES PATENT OFFICE 2,082,398

TRAILER HITCH AND AUTOMATIC BRAKE CONTROL

Louis T. Hughes, Ocate, N. Mex.

Application May 31, 1935, Serial No. 24,433

3 Claims. (Cl. 188—142)

This invention relates to trailer hitches.

One of the objects of the present invention is to provide a hitch for connecting a trailer to a propelling vehicle which applies and releases the brakes on the trailer automatically in response to the pulling or retarding of the propelling vehicle.

Another feature of the present invention resides in a novel arrangement whereby the pulling or retarding effect of the vehicle is cushioned so as to overcome jerking and vibration experienced in trailers pulled with conventional hitches.

A still further feature of the present invention is the provision of locking means between the moving parts in the trailer hitch whereby the housing may be locked with respect to the tongue so as to permit the trailer to be backed by the propelling vehicle.

A still further object of the present invention is to provide a ball and socket connection between the hitch and the propelling vehicle that furnishes universal movement between the hitch and the vehicle.

Further objects of the invention are to provide a device of the character referred to that is strong, compact and durable, very efficient in operation, easily controlled from the propelling vehicle, that is adaptable for installation on conventional trailers and propelling vehicles, and that is comparatively inexpensive to manufacture and operate.

With the foregoing and other objects in view, the invention consists of a novel construction, combination and arrangement of parts as will be hereinafter more specifically described and illustrated in the accompanying drawings wherein is disclosed a preferred embodiment of the invention, but it is to be understood that changes, variations, and modifications may be resorted to without departing from the spirit of the claims hereunto appended.

In the drawings wherein like reference characters denote corresponding parts throughout the several views:

Figure 1 is a top plan view of the trailer hitch in accordance with the present invention.

Figure 2 is a side elevation thereof.

Figure 3 is a detailed vertical section through the sleeve of the housing and the tongue taken substantially on line 3—3 of Figure 1 and looking in the direction of the arrows.

Figure 4 is a transverse detailed vertical section taken substantially on line 4—4 of Figure 2.

Figure 5 is a top plan view of the tongue, cylinders and reservoir removed from the housing and showing parts thereof broken away.

Figure 6 is a side elevation of a portion of the tongue and the cylinders removed from the housing showing parts thereof broken away, and taken substantially on line 6—6 of Figure 5.

Figure 7 is a horizontal section taken substantially on line 7—7 of Figure 3 and looking in the direction of the arrows.

Figure 8 is a side elevation of the brake control drum removed from its bearing.

Figure 9 is a perspective view of one of the piston rod connecting arms detached from the tongue.

Referring to the drawings in detail, A indicates generally a housing which is made of a steel casting in the preferred embodiment of the invention. The housing A is adapted to be disposed horizontally. This housing is made with a substantially square bearing sleeve 11 formed with a square bearing opening 12 extending from one end to the other in the sleeve. At each end of chamber 12 there are a pair of semi-circular recesses 13 formed in each wall of the sleeve surrounding the chamber thereby making four pairs of recesses at each end of the sleeve 11 and seated in these recesses are the roller bearings 14. An intermediate portion of the elongated square tongue B extends through the bearing opening 12 and rides on the roller bearings 14.

In the top wall 11a of the bearing sleeve 11 is a slot 15 which registers with bearing chamber 12.

The square tongue B is materially greater in length than the bearing sleeve 11 and is adapted for sliding movement in the bearing chamber 12. In a portion of the upper face of the tongue B is formed the spaced rack teeth 16 and these teeth align with the slot 15. Rising from the top wall 11a on the opposite sides of the slot 15 are upstanding bearing ears 17. Extending between the spaced ears 17 and anchored thereto are a pair of spaced bearing spindles 18, 19. On the lower spindle 18 is rotatably mounted a gear 20 the lower portion of which extends through the slot 15 and meshes with the teeth 16 on the tongue B. Meshing with the gear 20 there is a pinion gear 21 preferably formed integral with the brake control drum 22 both of which are rotatably mounted on the upper spindle 19. The reduction between gear 20 and pinion 21 is in the ratio of two to one so that the drum 22 moves twice the distance of gear 20. In the periphery of the brake control drum 22 is an annular channel 23 about which is trained a portion of the brake control cable 24 and the free forward end of this brake cable is anchored as at 25 in the channel. There is a guide bar 26 bolted as at 27 across the lower portions of the ears 17 at the rear having an aperture therein through which is trained an intermediate portion of the brake cable 24 and this brake cable extends rearwardly to the trailer (not shown). The rear free end of cable 24, it will be understood, is to be connected to the brake arms on the trailer (not shown). It is pointed out that the forward movement of brake cable 24 applies the brakes on the trailer. In an intermediate portion of the cable 24 is attached a spring 28 to take up the slack in the cable.

The rear projecting end of the tongue B is provided with a vertical opening 29 which is adapted to receive the bolt 30 whereby the rear end of the tongue is connected to an extension 31 leading from the trailer (not shown). To lock the housing A with respect to the tongue B I provide a swingable yoke C which has the crown 32 thereof disposed in the path of the forward projecting end of the tongue B. Integral legs 33 on the yoke extend rearwardly and are pivoted as at 34 to the forward end of the sleeve 11. On the inner end of the upper leg 33 of the yoke is an extension arm 35 formed with an opening 36 on its outer end by which the extension may be connected to a rod 35a leading from the propelling vehicle not shown. This rod may be controlled by a lever within reach of the driver in the propelling vehicle. By swinging the yoke to the dotted line position shown in Figure 1 the crown is out of the path of the tongue B, but when it is desired to back the trailer from the propelling vehicle the yoke C is swung to the full line position indicated in Figure 1 of the drawings.

The ball and socket coupling consists of a ball 36 formed on and depending from the bottom wall of the sleeve 11 movably mounted in the socket 37 formed in the confronting inner faces of a pair of blocks 38, 39 bolted together by a pair of bolts 40. The blocks 38, 39 may be bolted as at 41 to the conventional extension 42 projecting rearwardly from the propelling vehicle (not shown).

The housing A further includes a casing formed on the side of the sleeve 11 and this casing is slightly less in length than the sleeve. The top wall 43 of the casing is preferably cast integral with and in alignment with top wall 11a of the sleeve. There is a bottom wall 44 on the casing spaced from the top wall 43 and in alignment with the bottom wall of the sleeve. The inner wall of the casing is formed by the side wall of the sleeve and the outer side of the casing is closed by a face plate 45 bolted as at 46 to the top and bottom wall of the casing. There is a chamber 47 in the casing extending from one end to the other thereof. In the center of the chamber 47 there is a vertical bridge wall 48 held in position by the bolt 49 extending from bottom wall 44 to the top wall 43. Extending through chamber 47 on one side are elongated cylinders 50, 51 disposed one above the other and these cylinders are supported by the bridge wall 48. Extending through chamber 47 is a tubular reservoir 52 which is maintained full of a non-freezing liquid such as glycerine 53. The center of reservoir 52 extends through and is supported in the bridge wall 48.

In the chamber 47 reservoir 52 has a union connection 54 which supports a vertical division plate 55 across the chamber in the reservoir. In the center of the division plate 55 is a reducing orifice 56 which restricts the flow of glycerine from one side to the other of the plate 55. The reservoir 52 and the cylinders 50, 51 lie substantially in a horizontal plane. The forward end of reservoir 52 is connected by a U-shaped fitting 57 to the forward end of the lower cylinder 51. The rear end of reservoir 52 is connected by a similar fitting 58 to the rear end of the upper cylinder 50. In the upper face of fitting 58 is a removable screw plug 59 used to replenish the supply of glycerine in the reservoir. It will be seen that the fittings 57 and 58 are disposed diagonally with respect to a horizontal plane because the cylinders 50, 51 are spaced respectively above and below the reservoir 52.

The rear end of lower cylinder 51 is closed by a screw cylinder head 60 through which an intermediate portion of the piston rod 61 extends. On the forward end of piston rod 61 is a piston 62 that reciprocates in the cylinder. The rear end of piston rod 61 is connected to a laterally extending arm 63 secured to the bottom of the rear end of the tongue B by means of the bolts 64. The forward end of the upper cylinder 50 is closed by the cylinder head 65 through which an intermediate portion of piston rod 66 extends. The inner end of piston rod 66 carries a piston 67 which reciprocates in the upper cylinder 50. The forward free end of piston rod 66 is connected as at 67' to the end of arm 68. The inner end of arm 68 is connected to the top of the forward end of the tongue B by the bolts 69. It will be understood that glycerine 53 fills the spaces between the inner ends of the respective pistons so that pressure of any moving pistons displaces glycerine from one side to the other of the division plate 55. It will thus be seen that when the propelling vehicle is pulling in a forward direction, tongue B will have a tendency to move rearwardly while housing A has a tendency to move forwardly and when any slack is experienced between the pulling vehicle and trailer such jolts will be cushioned by the passage of the glycerine through the restricted orifice 56. When the propelling vehicle moves housing A that carries the cylinders 50, 51, and 52, the liquid 53 transmits the movement to the piston rods 61, 66, which move the tongue B and the latter pulls the trailer.

As long as the propelling vehicle is pulling forwardly the spring 28 will take up any slack in the brake applying cable 24. However, when the propelling vehicle is applying the brakes, the tongue B will be urged forwardly which causes drum 22 to rotate in a clockwise direction thereby pulling on cable 24 and applying the brakes. When the brakes are released on the propelling vehicle and it again assumes a pulling relation with respect to the trailer, the tongue B moves rearwardly causing drum 22 to rotate in a counterclockwise direction thereby slackening the brake applying cable 24 which slack releases the brakes on the trailer. Excess slack in the cable 24 is taken up by the spring 28.

Having thus described the invention, what is claimed as new is:

1. A trailer hitch comprising a housing, a slidable tongue mounted in the housing, swivelled coupling means on the housing for engaging the housing with a propelling vehicle, connecting means on the tongue for engaging a trailer, rotatable means on the housing coacting directly with the tongue for applying brakes on the trailer, and non-compressible coacting means on the housing and the tongue to cushion the movement of the housing with respect to the tongue.

2. A trailer hitch comprising a housing, a slidable tongue mounted in the housing, coupling means on the housing for engaging the housing with a propelling vehicle, connecting means on the tongue for engaging a trailer, rotatable means on the housing operated by direct engagement with the tongue for applying brakes on the trailer, coacting means on the housing and the tongue to cushion the movement of the housing with respect to the tongue, and a rockable member carried by the housing swingable into and out of the path of the slidable tongue to lock the tongue to the housing to permit the trailer to be backed by the propelling vehicle.

3. A trailer hitch comprising a housing, a slidable tongue mounted in the housing, coupling means on the housing for engaging the housing with a propelling vehicle, connecting means on the tongue for engaging a trailer, rotatable means on the housing coacting with the tongue for applying brakes on the trailer, coacting means on the housing and the tongue to cushion the movement of the housing with respect to the tongue, a rockable member carried by the housing swingable into and out of the path of the slidable tongue to lock the tongue to the housing to permit the trailer to be backed by the propelling vehicle, said coacting means including a pair of cylinders and a reservoir connected therewith, pistons in the cylinders connected at their free ends to the opposite ends of the tongue, and means on the reservoir for restricting the flow of liquid through the reservoir.

LOUIS T. HUGHES.